Oct. 18, 1960

C. J. HEISLER 2,956,571

APPARATUS FOR WASHING AND STERILIZING
MILKING MACHINES AND THE LIKE

Filed Feb. 6, 1956

INVENTOR
Clarence J. Heisler
BY Roy A. Plant
ATTORNEY

Oct. 18, 1960 C. J. HEISLER 2,956,571
APPARATUS FOR WASHING AND STERILIZING
MILKING MACHINES AND THE LIKE
Filed Feb. 6, 1956 4 Sheets-Sheet 2

INVENTOR
Clarence J. Heisler.
BY Roy A. Plant
ATTORNEY

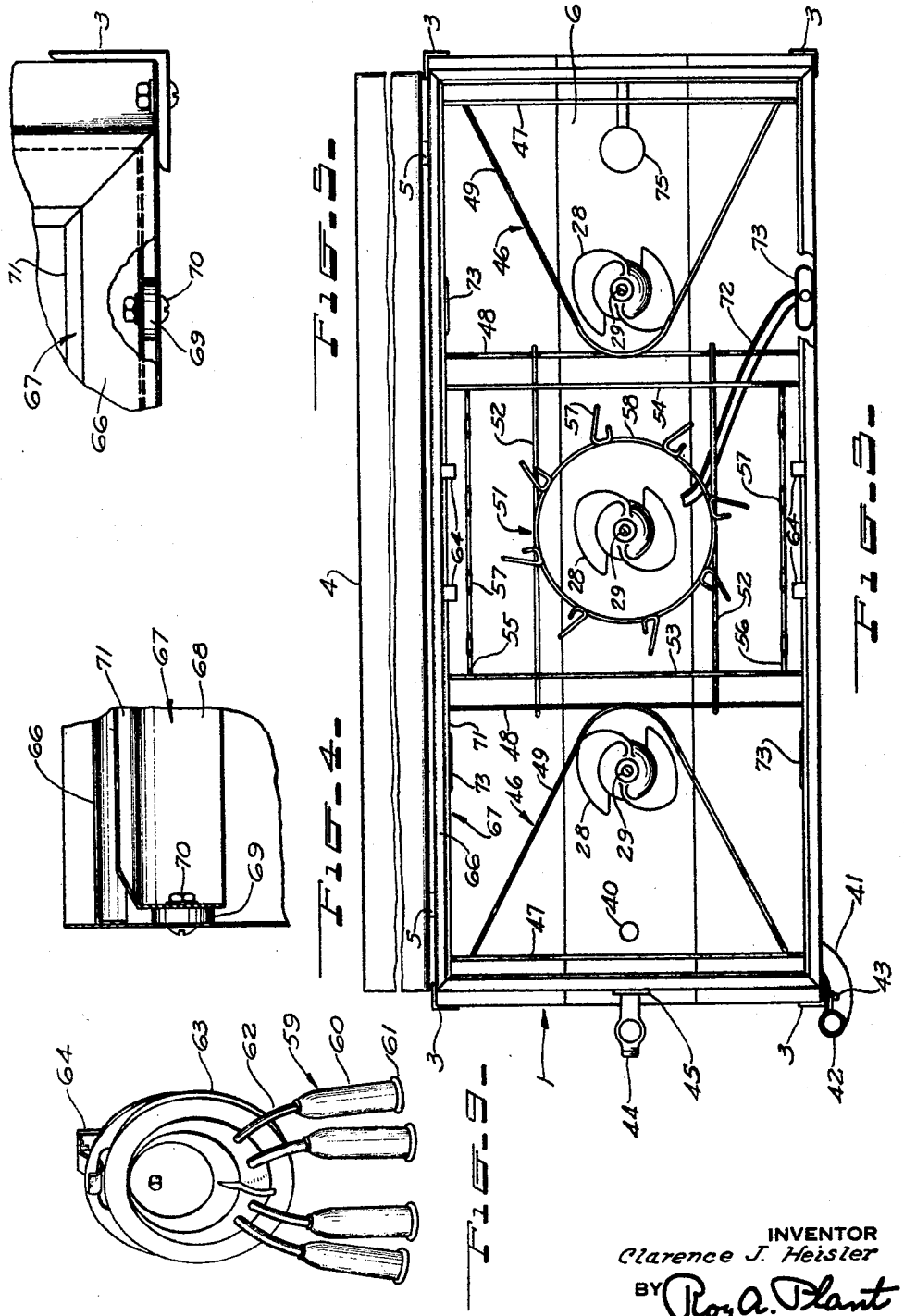

Oct. 18, 1960 C. J. HEISLER 2,956,571
APPARATUS FOR WASHING AND STERILIZING
MILKING MACHINES AND THE LIKE
Filed Feb. 6, 1956 4 Sheets-Sheet 4
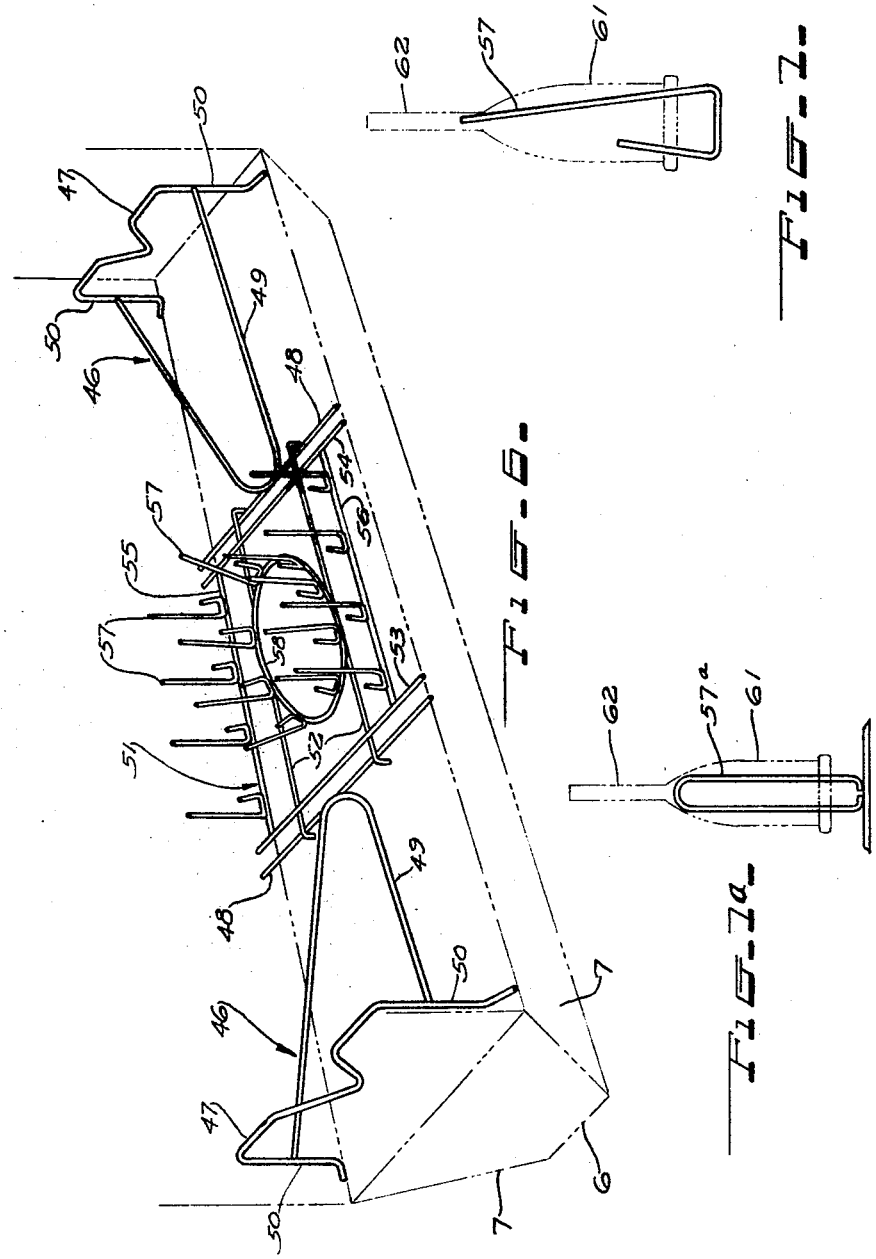
INVENTOR
*Clarence J. Heisler*
BY *Roy A. Plant*
ATTORNEY

United States Patent Office 2,956,571
Patented Oct. 18, 1960

2,956,571

APPARATUS FOR WASHING AND STERILIZING MILKING MACHINES AND THE LIKE

Clarence J. Heisler, Rte. 2, Springport, Mich.

Filed Feb. 6, 1956, Ser. No. 563,569

8 Claims. (Cl. 134—169)

The present invention deals broadly with washing and sterilizing, and in its specific phases with equipment for washing and sterilizing milking machine apparatus and milk contacting equipment such as strainers used therewith.

In the field of washing and sterilizing milking equipment, and particularly the milk carrying portion of milking machine apparatus, there has been the hand washing procedure, and that is the common one still used. In addition some specialized equipment has been devised for washing a portion of such milking machine apparatus, for instance by circulating through the inside of inflations a suitable cleaning liquid such as hot water or hot water with a suitable detergent in same. However, there has been no washing machine for milking machine apparatus which will take the inflations, pail, cover assembly, hoses, and strainer, and thoroughly wash them inside and out, while avoiding the need of separate hand washing of at least a portion of the milking machine apparatus to be cleaned and sterilized. It was a recognition of the problems involved and the lack of any fully satisfactory solution to same which led to the conception and development of the present invention.

Accordingly among the objects of the present invention is the provision of a highly efficient washing and sterilizing apparatus particularly adapted for washing the milk contacting and carrying portion of milking machine apparatus, which must be thoroughly cleaned and sterilized every time it is used.

Another object is to provide a washing and sterilizing apparatus wherein a "Surge" type pail cover with its gasket and inflations thereon can be thoroughly sterilized inside and out without disassembly.

Another object is to provide a washing and sterilizing apparatus wherein same has a tank with racks, and which is adapted to hold the milk pail, cover with inflations, hose, strainer, et cetera, so that they can be thoroughly cleaned and sterilized both inside and out by means of a spray of suitable liquid.

A further object is to provide a washing and sterilizing apparatus particularly adapted for washing milking machine equipment, and wherein same has multiple impellers to give "cross fire" flushing of such apparatus for sterilization and cleaning of same both inside and out.

A further object is to provide a special seal of baffle construction around the upper edge of the tank of the washing and sterilizing apparatus so as to avoid the necessity of using a rubber gasket to seal the cover on the tank.

A further object is to provide a washing and sterilizing apparatus adapted for handling milking machine equipment so as to meet the sanitation requirements, and yet do so with equipment which may be expeditiously manufactured and easily kept clean and sanitary.

Still further objects and advantages of the present invention in its various phases will become apparent as the description proceeds.

To the accomplishment of the foregoing and related ends, the invention, then, consists of the washing and sterilizing means hereinafter fully described and particularly pointed out in the claims, the annexed drawings and the following description setting forth in detail certain means and modes illustrating, however, but several of the various ways in which the principle of the invention may be used.

In the annexed drawings:

Figure 4 shows a fragmentary vertical cross section of an upper corner of the tank of the assembly at one end of same.

Figure 5 shows a fragmentary partially sectioned horizontal top view of one corner of the assembly.

Figure 6 shows a perspective view of a preferred form of the rack members used inside the tank of the assembly.

Figure 7 shows a preferred form of inflation holding member.

Figure 7a shows a modified form of inflation holding member.

Figure 8 shows in diagrammatic manner a vertical section through one of the impellers and the drive for same.

Figure 9 shows a perspective view of a cover for one form of milking machine pail, said cover having inflation assemblies in place thereon, and the whole assembly supported on a suitable hook in position for mounting the inflations on individual holders ready for washing and sterilization.

Figure 1:
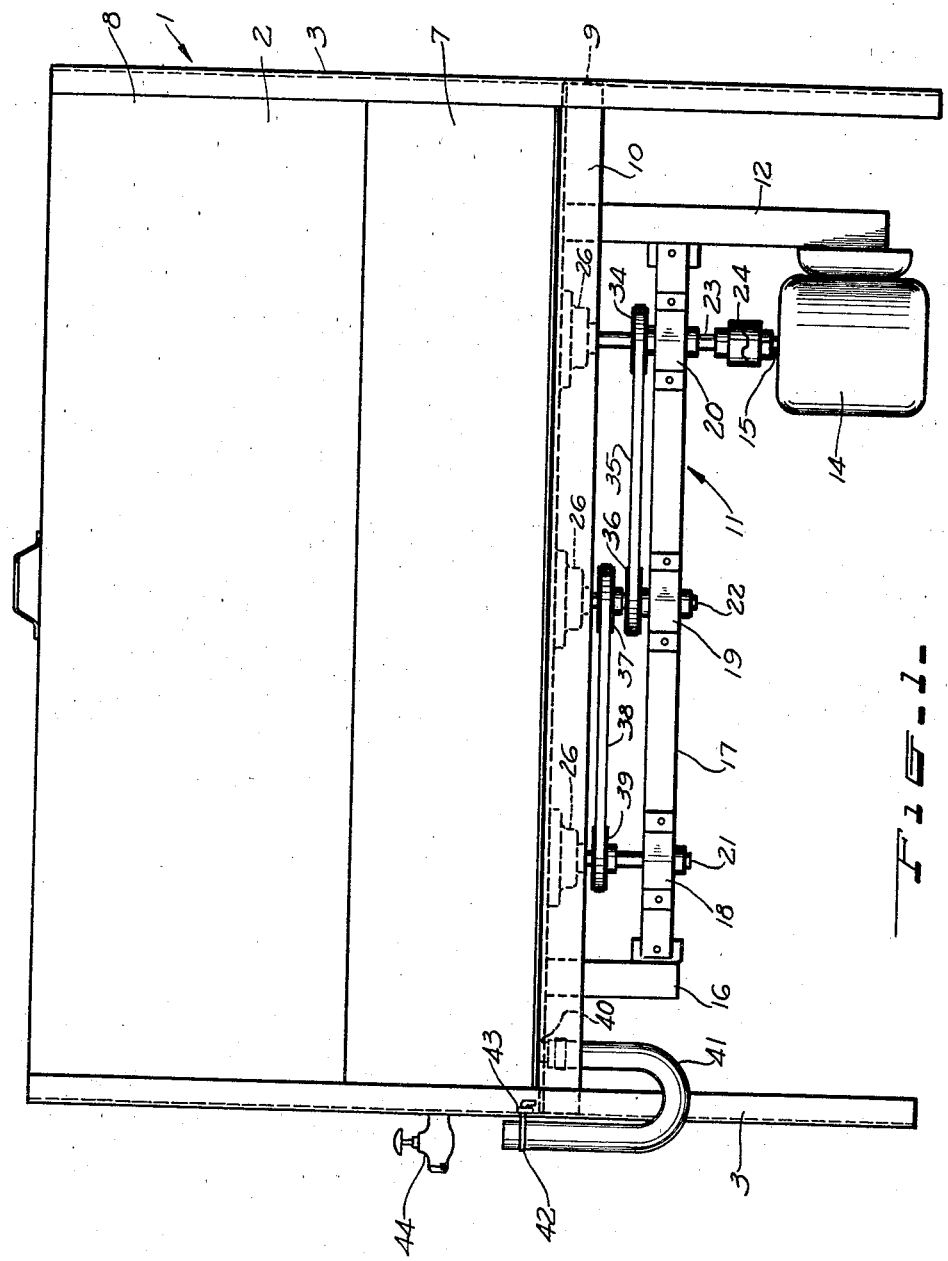
Figure 1 shows a side elevation of one preferred form of the washing and sterilizing apparatus.
Figures 2, 3:
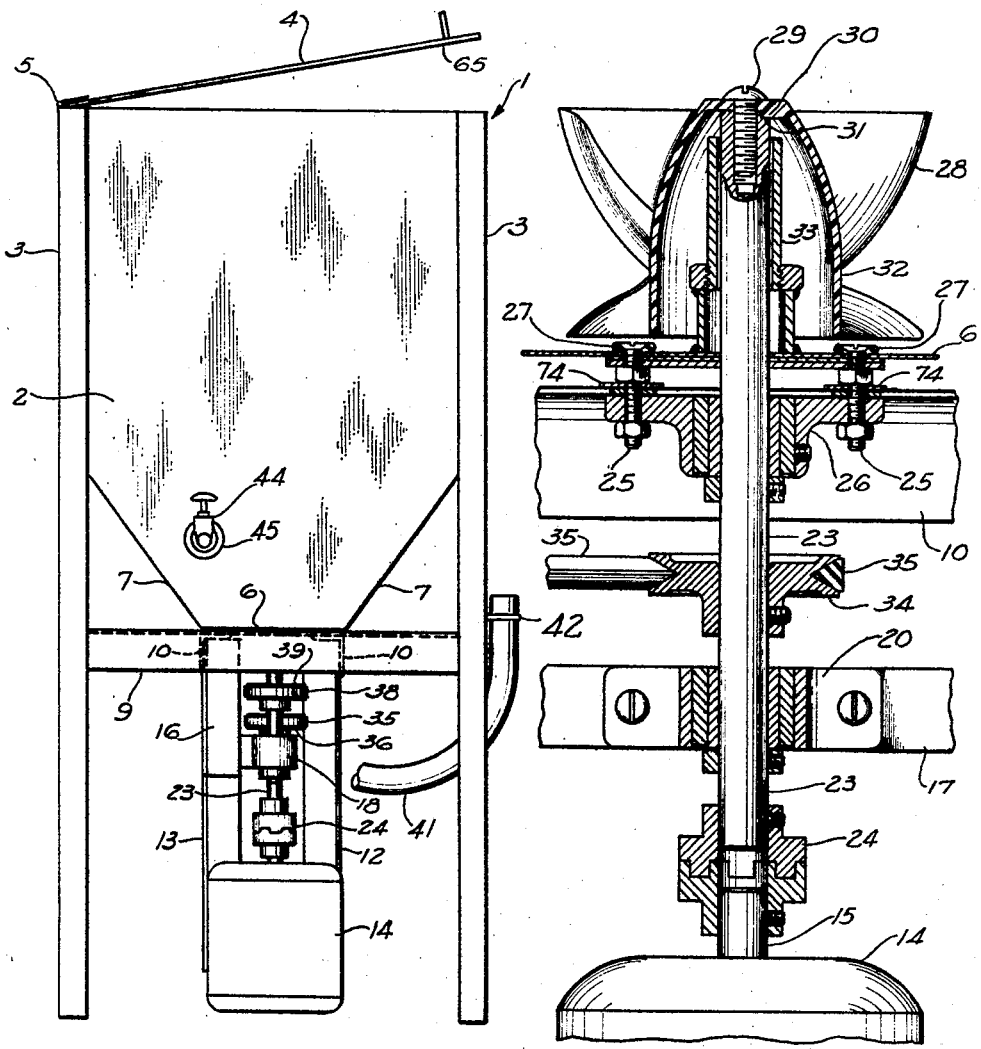
Figure 2 shows an end elevation of the apparatus shown in Figure 1.
Figure 3 shows a top view of the apparatus shown in Figure 1, with the cover in open position and partially broken away.

Referring more particularly to Figures 1, 2, and 3 of the drawings, the over-all assembly of the washing and sterilizing machine 1 has a tank 2 mounted on legs 3, and provided with a cover 4 mounted on hinges 5. The bottom of the tank 2 is preferably substantially flat at its central bottom portion 6 and tapered upward and outward at 7 to the side panels 8. The legs 3 at each end are joined with a cross member 9 which is preferably in the form of an angle iron. Supported on these angle irons and fixedly joined to same are a pair of longitudinal frame members 10 which are preferably of angle iron form and located under the bottom side edges of bottom portion 6 of tank 2 to provide support for same as well as for another purpose, as will be hereinafter set forth.

Suspended from the frame members 10 is a driving assembly 11. At one end of this driving assembly are a pair of vertically depending support members 12 and 13 on the lower end of which is mounted a suitable size electric motor 14 with its drive shaft 15 extending in vertical direction. In use this motor will be conventionally attached to a suitable source of power, which has not been shown as it is not a part of the present invention. A short support member 16 is also joined to one of said frame members 10, at the other end of the driving assembly, and extends downward in a vertical direction substantially parallel to support members 12 and 13. Extending between said members 13 and 16, and conventionally anchored to same as by welding or otherwise, is a horizontal bar member 17, on one side of which are mounted suitable bearings 18, 19, and 20. Fitting these bearings in vertical direction are respectively shafts 21, 22, and 23.

Shaft 23, Figure 8, is connected by means of a conventional coupler 24 to drive shaft 15 of motor 14. Mounted on frame members 10, for instance by means of bolts 25, of which four are preferably used, is a bearing 26 which is in alinement with bearing 20 and through which passes shaft 23. Bolts 25 also pass through the bottom portion 6 of the tank with the heads of said bolts sealed on gaskets 27 to prevent leakage of washing liquid from tank 2. The bolts 25 which come between frame members 10 preferably pass through stabilizing cross bars 74 which are conventionally anchored to said frame members. Mounted on the upper end of shaft 23 is an impeller 28 which is held in place by means of a screw 29. This impeller, as is common with impellers, is provided with an internal rib 30 which engages a corresponding groove 31 in the end of shaft 23 so that the two will rotate in unison. The body 32 of the impeller is hollow with a relatively large open bottom and a small closed top through which screw 29 passes. Mounted on bottom portion 6 of tank 2, as by welding, is an upright tubular member 33, of any suitable type, which is concentric with shaft 23 and has its upper end open so that shaft 23 will project out of same. This open upper end of tubular means 33 is above the cleaning liquid level at which the washing and sterilizing apparatus operates so that there is no overflow at this point.

Mounted on shaft 23, Figure 8, is a V-belt pulley 34 which drives a V-belt 35 which passes around a V-belt pulley 36, Figure 1, on shaft 22, and that shaft in turn has a second V-belt pulley 37 which drives a V-belt 38 which in turn passes around a V-belt pulley 39 on shaft 21. All four of these V-belt pulleys are preferably of like size so that shafts 21, 22, and 23 will all rotate at substantially the same speed. Shafts 21 and 22 are each provided with an impeller 28 on their upper end, with same preferably arranged and mounted in like manner as has been shown in Figure 8 and described in connection with the driving of same through shaft 23, and in order to avoid duplication, no further description of same will be made.

On the bottom of bottom portion 6 of tank 2, Figure 1, is conventionally connected a drain outlet member 40 to which is conventionally connected a piece of hose 41 which has a hook ended clamp member 42 adjacent its open end and which clamp member is adapted to engage and be supported by a hook 43 mounted on a leg 3 of the assembly. This open end of hose 41 serves two purposes with one being that of acting as an overflow to maintain the desired operating level of the cleaning liquid in tank 2, and the other being to serve as a drain for use in emptying the cleaning liquid at the end of the washing and sterilizing operation of the machine. The washing and sterilizing liquid can be delivered to the machine in any suitable manner, and a preferred construction involves the use of a permanent connection through a valve 44, Figure 2, conventionally connected to the interior of tank 2 through a flange mounting 45.

In the bottom portion of tank 2, as show in Figures 3 and 6, there is mounted a special rack assembly, and which, in preferred construction, is in the form of three separate portions, which facilitate manufacture and assembly, with the pail carrying rack portions 46 at each end of the assembly being of identical construction. Such pail carrying portion 46 having an upright substantially inverted U-shaped member 47 at one end, and a crossbar 48 at its other end. The legs of the inverted U-shaped member 47, and the ends of the crossbar 48 are preferably supported on the upper edge of the upward and outward tapered bottom portions 7 of tank 2. A U-shaped member 49 is joined at the base of the U substantially at the center of crossbar 48, while the points of the U are joined part way up the legs 50 of the U-shaped member 47 so that when the pail (not shown) is placed thereon upside down, the corresponding impeller 28, under operating conditions, will forcibly throw washing liquid into the inside of the pail, while the center impeller 28 will simultaneously cause washing liquid to be thrown so as to spray the bottom and other outer portions of the pail and forcibly flush contamination or soil from same.

The center or inflation carrying portion 51 of the rack, Figures 3 and 6, has a pair of lengthwise-extending hook-ended rods 52 which hook over and rest on the crossbar 48 of each of the pail carrying portions 46. Adjacent the ends of the hook-ended rods 52 are crossbars 53 and 54 which are approximately of the same length as crossbars 48 and positioned adjacent same so as to hold the inflation carrying portion 51 of the rack approximately centered between the sides of the tank. Spaced a short distance from the sidewalls of tank 2 and substantially parallel with same are lengthwise-extending rods 55 and 56. Mounted on the upper edge of these rods 55 and 56 are a series of upright support members 57 or 57a. A ring member 58 is substantially centrally mounted on the lengthwise-extending rods 52 and such ring member also carries some additional upstanding support members 57 or 57a which preferably flare outward slightly, all for a purpose to be hereinafter set forth.

Milking machines utilize what is known as inflation assemblies 59, Figure 9, and each of these consists of a metal shell 60, which fits over the inflation 61, Figure 7, which is preferably formed of natural or synthetic rubber and which forms the enlarged end of a piece of flexible but rather stiff hose 62, Figure 9. With "Surge" type equipment these assemblies have short hose portions and are mounted on the pail cover 63. In the present apparatus this cover can be hung on a hook 64, Figures 3 and 9, and then the inflation assemblies 59 can be slipped down over the support members 57 or 57a on ring 58 in the manner shown in Figure 7, or for fast operation the inflation assemblies can be allowed to hang free in the upward path of the forcibly thrown washing liquid. The center impeller 28 will then forcibly drive the washing liquid into the lower end of, and over, the inflation assemblies to wash and sterilize same. If desired, however, the inflation assemblies can be removed from cover 63, and taken apart, in which case, if desired, the shells 60 can be placed on the support members 57 or 57a carried on rods 55 or 56, Figure 6, and the inflations 61 can be placed on the support members 57 or 57a mounted on ring 58. This apparatus is the only one currently on the market which permits washing the milk strainer (not shown) along with the rest of the milking apparatus, and this is done by setting the strainer in the space above ring 58 over the center impeller 28, and with small end of the strainer down.

The cover 4 of tank 2 has a turned down flanged edge 65, Figure 2, and such flanged edge, when the cover is closed, rests on an inturned flange member 66, Figures 4 and 5. In order to avoid the necessity of placing a gasket between the inturned flange member 66 and the turned down flanged edge 65 of cover 4, a special baffle means is provided. This baffle means 67 extends all the way around the top of tank 2 and is spaced just slightly below the inturned flange member 66. This baffle means 67 preferably has a downturned side member 68 which is spaced from the sides of tank 2 by means of spacers 69 and bolts or the like 70 to facilitate cleaning as well as drainage of liquid passing over flange 71 of said baffle 67. At the upper edge of side member 68 there is an upwardly and inwardly turned flange 71 which extends further inward than the width of inturned flange member 66 on which the downturned flange edge 65 of cover 4 rests. This type of construction causes the upwardly driven washing liquid to bounce off of the under side of flange 66 away from flange 66 and largely toward the central portion of cover 4, and to allow very little of such washing liquid to even contact the inturned flange 66. Moreover, the spacers 69 allow any washing liquid which gets behind flange 71 to run back down the inside of tank 2 so as to be self cleaning. The baffling of this washing liquid also helps to direct same back onto the milking machine parts for still better washing and sterilization of same.

Some of the milking machines, such as the De Laval, utilize milk carrying tubes or rubber hose 72, Figure 3, and in order to sterilize same, the persent apparatus is provided with open top funnels 73 which can be mounted on the sidewalls of the tank 2 just below the baffle means 67. This allows the hose to hang down from the funnel 73 to the bottom of the tank and in which position some of the washing liquid thrown by the impellers 28 will be directed by baffle 67 and caught in said funnels 73 from whence it will flow through said tube 72 and out the lower end of same. At the same time the washing liquid thrown by the impellers 28 will wash the outside of the hose, thus thoroughly cleaning and sterilizing same.

In washing milking machine parts it is desirable to use water which is at least at a temperature of 150° F., which will kill substantially 100% of the bacteria in about fifteen seconds. The use of a suitable detergent makes the cleaning easier and the bacteria kill more rapid. If desired an electric heating unit 75, Figure 3, may be mounted in the bottom of tank 2 to maintain the water temperature at a desired temperature level even under prolonged washing periods.

It is thus clear that the present apparatus is very versatile in use and that the milking machine equipment which needs washing and sterilizing can be placed inside the tank of the apparatus and completely washed without leaving any of same out for hand washing, which is a source of inconvenience with presently used milking machine washing equipment.

Other modes of applying the principle of my invention may be employed instead of those explained, change being made as regards the means herein disclosed, provided those stated by any of the following claims or their equivalent be employed.

I therefore particularly point out and distinctly claim as my invention:

1. A washing and sterilizing apparatus for milking machines and the like, which comprises a tank adapted to hold a body of suitable cleaning liquid, a cover for said tank, rack means in the lower portion of said tank but spaced above the bottom of same, said rack means being adapted to suitably support, above the body of said cleaning liquid in said tank, substantially all of the milking machine parts to be washed therein, a portion of said rack having upwardly extending members adapted for threading into and gripping milking machine inflations with their large end opening downward for upward reception of said cleaning liquid and free draining at the end of the washing operation, separate movable means in the portion of said tank below said rack means and setting in said body of suitable cleaning liquid in the bottom portion of said tank, said movable means being adapted to forcibly throw said cleaning liquid directly upward and sidewise to flush same onto said parts in said tank ready to be washed, and means for suitably driving each of said separate flushing means, wherein said rack means has at least one carrying portion for an upside down milking machine pail with the milking machine inflation carrying portion of said rack adjacent to same, there being one of said flushing means under each pail carrying portion and another under the inflation carrying portion of said rack means.

2. A washing and sterilizing apparatus for milking machines and the like, which comprises a tank adapted to hold a body of suitable cleaning liquid, a cover for said tank, rack means in the lower portion of said tank but spaced above the bottom of same, said rack means being adapted to suitably support, above the body of said cleaning liquid in said tank, substantially all of the milking machine parts to be washed therein, a portion of said rack having upwardly extending members adapted for threading into and gripping milking machine inflations with their large end opening downward for upward reception of said cleaning liquid and free draining at the end of the washing operation, separate movable means in the portion of said tank below said rack means and setting in said body of suitable cleaning liquid in the bottom portion of said tank, said movable means being adapted to forcibly throw said cleaning liquid directly upward and sidewise to flush same onto said parts in said tank ready to be washed, and means for suitably driving each of said separate flushing means, wherein said movable means in the bottom portion of said tank for direct upward and sidewise flushing of a suitable cleaning liquid over the parts to be washed comprises vertically mounted impellers, all of which are substantially in line and adapted for direct upward and sidewise delivery of said cleaning liquid.

3. A washing and sterilizing apparatus for milking machines and the like, which comprises a tank adapted to hold a body of suitable cleaning liquid, a cover for said tank, rack means in the lower portion of said tank but spaced above the bottom of same, said rack means being adapted to suitably support, above the body of said cleaning liquid in said tank, substantially all of the milking machine parts to be washed therein, a portion of said rack having upwardly extending members adapted for threading into and gripping milking machine inflations with their large end opening downward for upward reception of said cleaning liquid and free draining at the end of the washing operation, separate movable means in the portion of said tank below said rack means and setting in said body of suitable cleaning liquid in the bottom portion of said tank, said movable means being adapted to forcibly throw said cleaning liquid directly upward and sidewise to flush same onto said parts in said tank ready to be washed, and means for suitably driving each of said separate flushing means, wherein said tank has an internal flange means all around same just below its upper edge to support and cooperate with said cover in closing said tank when said cover is in contact therewith, and a baffle means all the way around said tank and mounted directly below said flange, said baffle means being wider than said flange and tapering inward and upward to shield said flange from direct impingement with the spray of said cleaning liquid as delivered by each of said movable flushing means, said baffle means also having a downward extending bottom flange spaced inward from the side walls of said tank to form an open-through drainage channel all around said tank to facilitate drainage of said cleaning liquid and sanitary operation and cleaning of the apparatus, without the necessity of using a gasket whereby a substantially liquid tight joint between said cover and flange is obtained.

4. A washing and sterilizing apparatus for milking machines and the like, which comprises a tank adapted to hold a body of suitable cleaning liquid, a cover for said tank, rack means in the lower portion of said tank but spaced above the bottom of same, said rack means being adapted to suitably support, above the body of said cleaning liquid in said tank, substantially all of the milking machine parts to be washed therein, a portion of said rack having upwardly extending members adapted for threading into and gripping milking machine inflations with their large end opening downward for free draining at the end of the washing operation, separate movable means in the portion of said tank below said rack means and setting in said body of suitable cleaning liquid in the bottom portion of said tank, said movable means being adapted to forcibly flush said cleaning liquid over the parts in said tank ready to be washed, and means for suitably driving each of said separate flushing means, and wherein there is a series of said upstanding inflation holders on said rack means, with some of said inflation holders being adapted to also support and hold inflation shields, and said tank has at least one hook adjacent its upper edge for suspending a milking machine pail cover with its inflations in position to be threaded over some of said inflation holders.

5. A washing and sterilizing apparatus for milking machines and the like, which comprises a tank adapted to hold a body of suitable cleaning liquid, a cover for said tank, rack means in the lower portion of said tank but spaced above the bottom of same, said rack means being adapted to suitably support, above the body of said cleaning liquid in said tank, substantially all of the milking machine parts to be washed therein, a portion of said rack having upwardly extending members adapted for threading into and gripping milking machine inflations with their large end opening downward for upward reception of said cleaning liquid and free draining at the end of the washing operation, separate movable means in the portion of said tank below said rack means and setting in said body of suitable cleaning liquid in the bottom portion of said tank, said movable means being adapted to forcibly throw said cleaning liquid directly upward and sidewise to flush same onto said parts in said tank ready to be washed, and means for suitably driving each of said separate flushing means, wherein said tank has at least one open-top, flattened funnel mounted on the tank inner sidewall a short distance below the upper edge of same, the lower end of said funnel being adapted to be inserted into the open end of a milking machine hose for delivering therethrough said cleaning liquid forcibly flushed by said separate flushing means, while the outside of said hose is simultaneously being washed and sterilized by the cleaning liquid being flushed thereover by said same flushing means.

6. A washing and sterilizing apparatus for milking machines and the like, which includes a tank adapted to hold a suitable body of cleaning liquid, a cover for said tank, rack means in the lower portion of said tank but spaced above the bottom of same, said rack being above said body of cleaning liquid and adapted to suitably support at least a portion of the milking machine parts to be washed, separate vertically mounted impellers in the bottom portion of said tank below said rack means and setting in said cleaning liquid in position for flushing said cleaning liquid forcibly both upward and outward over the surface of the parts in said tank in position to be washed, one of said impellers being under a portion of said rack adapted to support a pail in upside down washing position, while another of said impellers is under another portion of said rack which carries a series of upwardly extending holding members for firmly holding milking machine inflations tightly threaded down thereover with their lower end open to receive said cleaning liquid delivered by said impeller thereunder, vertical shafts on which said impellers are mounted, open top tubular means through which said vertical shafts rotatably extend into said tank, said tubular means being joined fluid tight to the bottom of said tank and extending above the top of the body of liquid in said tank under washing conditions, and driving means which connects said shafts to a suitable source of power for simultaneous rotation.

7. A washing and sterilizing apparatus for milking machines and the like, which includes a tank adapted to hold a suitable body of cleaning liquid, a cover for said tank, rack means in the lower portion of said tank but spaced above the bottom of same, said rack being above said body of cleaning liquid and adapted to suitably support at least a portion of the milking machine parts to be washed, separate vertically mounted impellers in the bottom portion of said tank below said rack means and setting in said cleaning liquid in position for flushing said cleaning liquid forcibly over the surface of the parts in said tank in position to be washed, one of said impellers being under a portion of said rack adapted to support a pail in upside down washing position, while another of said impellers is under another portion of said rack which carries a series of upwardly extending holding members for holding milking machine inflations threaded down thereover with their lower end open to receive said cleaning liquid delivered by said impeller thereunder, vertical shafts on which said impellers are mounted, open top tubular means through which said vertical shafts rotatably extend, said tubular means being joined fluid tight to the bottom of said tank and extending above the top of the body of liquid in said tank under washing conditions, and driving means which connects said shafts to a suitable source of power for simultaneous rotation, and wherein said tank has at least one hook adjacent its upper edge for suspending a milking machine pail cover with its inflations in position to be threaded over some of said upwardly extending inflation holders.

8. A washing and sterilizing apparatus as set forth in claim 6, wherein said tank has an internal flange means all around same just below its upper edge to support and cooperate with said cover in closing said tank when said cover is in contact therewith, and a baffle means all the way around said tank and mounted directly below said flange, said baffle means being wider than said flange and tapering inward and upward to shield said flange from direct impingement with sprayed liquid as delivered by said impellers, said baffle means also having a downward extending bottom flange spaced inward from the side walls of said tank to form an open-through drainage channel all around said tank to facilitate drainage of said cleaning liquid and sanitary operation and cleaning of said apparatus whereby a substantially liquid tight joint between said cover and flange is obtained without the necessity of using a gasket.

References Cited in the file of this patent

UNITED STATES PATENTS

| | | |
|---|---|---|
| 860,515 | Beidler | July 16, 1907 |
| 1,259,939 | Walker | Mar. 19, 1918 |
| 1,679,465 | Conover | Aug. 7, 1928 |
| 1,765,557 | Wright | June 24, 1930 |
| 2,023,496 | Todd | Dec. 10, 1935 |
| 2,241,144 | Lattin | May 26, 1941 |
| 2,403,526 | Harris | July 9, 1946 |
| 2,556,128 | Webb | June 5, 1951 |
| 2,646,809 | Van Hise | July 28, 1953 |
| 2,752,927 | Stanitz | July 3, 1956 |
| 2,825,349 | Kehiler | Mar. 4, 1958 |